May 21, 1929.  F. E. COMSTOCK  1,713,998

HORIZONTAL FIN FOR FISH BAITS

Filed March 7, 1927

Frederick E. Comstock Inventor

N. S. Amstutz

By

Attorney

Patented May 21, 1929.

1,713,998

UNITED STATES PATENT OFFICE.

FREDERICK E. COMSTOCK, OF VALPARAISO, INDIANA.

HORIZONTAL FIN FOR FISH BAITS.

Application filed March 7, 1927. Serial No. 173,251.

My invention relates to improvements in horizontal fin for fish baits, and it more especially consists of the features pointed out in the claims.

The purpose of my invention is to provide a fish bait whose "swimming" movement as it is drawn through the water can be varied at will; that uses adjustable means to bring about shorter or longer side-to-side darts of the bait; that provides a horizontal fin beneath the bait which is secured to the body of the bait in an adjustable manner; and that attaches the fish line to an upward extension of the fin, or to a separate screw eye.

With these and other ends in view, I illustrate in the accompanying drawing such instances of adaptation as will disclose the broad underlying features of my invention without limiting myself to the specific details shown thereon and described herein.

In using my device I may employ whatever alternatives of structure and form that the exigencies of actual practice may demand without departing from the broad spirit of my invention.

Figure 1:
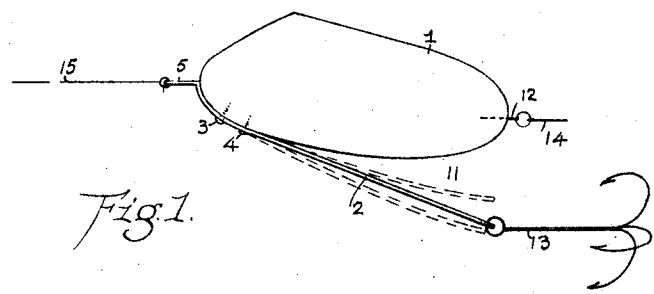
Figure 1 is a side elevation of a fish bait with my controlling fin attached to its front and under side.
Figure 2:
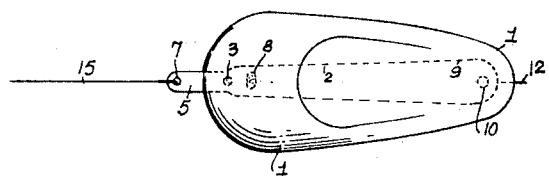
Figure 2 is a top plan view of Figure 1.

The body 1 of my bait may be of any desired shape and material that is floatable in the water. In order to control its sidewise movement to simulate the darting swimming activity of a live fish, I attach a horizontal fin 2 beneath the body. This fin may be more or less pliable so as to be bent into different vertical positions, as shown by dotted lines in Fig. 1. It is secured to the body by means of a pivot screw 3 that passes through a hole 6 formed near the front end of the fin. At the extreme front end it is bent upward and at about right angles to form an attaching end 5 which with its opening 7 for the line 15. To the rear of the pivot screw 3, a transverse slot 8 is formed, through which the screw 4 passes. At the rear end 9 the fin 2 is widened so as to give a stabilizing effect to the bait as it is drawn through the water by the line 15. At this end an eye 10 is formed for a hook 13, or a hook of any other type. The body of the bait at its rear end may also have a screw eye 12 to which the stem 14 of any desired hook may be attached.

Figure 3:
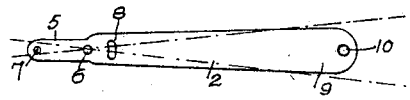
Figure 3 is a detached top plan view of the fin itself, showing a suggested range of horizontal adjustment.
Figure 4:
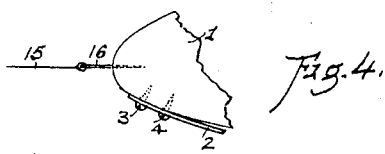
Figure 4 is a detached side elevation of the head end of a modified bait.

The use of a horizontal fin causes eddies to be formed in the space 11, between the fin and the body, which in turn cause the body to wiggle as it floats near the surface of the water when drawn by the fish line 15. The bait may also due to its composition float under water, more or less. In order that the user may be able to control the extent of the sidewise wiggle of the bait the fin may be adjusted to either side of the center of the body, as shown by means of the dash-dot lines of Fig. 3. This enables the fisherman to adapt the bait to suit whatever conditions he may encounter. If desired, the fin at its rear end may be made flat, or slightly curving in one or more directions as is found most practical. The fin 2 may terminate as shown in Fig. 4 and a screw eye 16 be attached to the front end of the bait for the line 15.

What I claim is:

1. In fish baits, a floatable body, a horizontal fin secured to its under side for lateral adjustment and projecting rearward of the body in spaced apart relation, and a hook attached to the rear end of the fin.

2. In a fish bait, a floatable body, a horizontally disposed fin secured to the body for lateral adjustment near the front end of the fin and body, the rear end of the fin projecting away from the body, and a fish line secured to the front end of the fin.

3. In a fish bait, a floatable body, a horizontally adjustable fin attached between its ends to the body, a fish line attached to its front end, and a hook attached to its free rear end.

4. In a fish bait, a floatable body, a horizontal fin having a free rear end, means for pivoting the fin to the body for lateral adjustment with respect to the center line of the body, and means for holding the fin onto the body after it has been adjusted.

In testimony whereof I affix my signature.

FREDERICK E. COMSTOCK.